(12) United States Patent
Masuda

(10) Patent No.: US 9,485,374 B2
(45) Date of Patent: Nov. 1, 2016

(54) IMAGE FORMING APPARATUS THAT DETECTS THE NUMBER OF CONNECTION STAGE OF A PAPER FEED CASSETTE UNIT

(71) Applicant: KYOCERA Document Solutions Inc., Osaka (JP)

(72) Inventor: Masatoshi Masuda, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 14/866,871

(22) Filed: Sep. 26, 2015

(65) Prior Publication Data

US 2016/0094743 A1   Mar. 31, 2016

(30) Foreign Application Priority Data

Sep. 26, 2014 (JP) ................................ 2014-196376

(51) Int. Cl.
*H04N 1/00* (2006.01)
*G03G 15/00* (2006.01)

(52) U.S. Cl.
CPC .......... *H04N 1/00665* (2013.01); *G03G 15/55* (2013.01); *G03G 15/6508* (2013.01); *H04N 1/0032* (2013.01); *H04N 1/0083* (2013.01); *H04N 1/00663* (2013.01)

(58) Field of Classification Search
CPC ...... B65H 1/266; B65H 7/02; H04N 1/0032; H04N 1/00663; H04N 1/0083
USPC ....... 358/1.15; 399/12, 13, 23, 45, 391, 393; 271/9.01, 9.11
See application file for complete search history.

(56) References Cited

U.S. PATENT DOCUMENTS

2008/0197558 A1* 8/2008 Nishimura ............... B65H 3/44
271/10.03
2013/0329241 A1* 12/2013 Hirao ................. G03G 15/6508
358/1.12

FOREIGN PATENT DOCUMENTS

JP         2002-002059 A        1/2002

* cited by examiner

*Primary Examiner* — Jamares Q Washington
(74) *Attorney, Agent, or Firm* — Hawaii Patent Services; Nathaniel K. Fedde; Kenton N. Fedde

(57) ABSTRACT

An image forming apparatus reducing number of control signals in detecting nth connection stage of a paper feed cassette unit piled up, and increases noise resistance. It includes a main body part and a paper feed cassette unit that can be piled up in plural stages under main body part. Main body part has a start control line transmitting a start signal; a ready control line transmitting a ready signal; and a main body side control part generating start signal and detects nth connection stage of paper feed cassette unit on number of times of ready signal. Paper feed cassette unit has a cassette side control part delaying start signal inputted from an upper stage through start control line to output it to a lower stage, and while delaying start signal, generating a ready signal to output it toward ready control line to upper stage.

6 Claims, 3 Drawing Sheets

IMAGE FORMING APPARATUS THAT DETECTS THE NUMBER OF CONNECTION STAGE OF A PAPER FEED CASSETTE UNIT

INCORPORATION BY REFERENCE

This application is based on and claims the benefit of priority from Japanese Patent Application No. 2014-196376 filed on Sep. 26, 2014, the contents of which are hereby incorporated by reference.

BACKGROUND

The present disclosure relates to an image forming apparatus that allows connection of paper feed cassette units in a plurality of stages.

DESCRIPTION OF THE RELATED ART

With some image forming apparatuses, paper feed cassette units can be connected to a main body part, being piled up in a plurality of stages, and the number of stages of the paper feed cassette units that are to be piled up can be increased or decreased in accordance with the required paper size, type, number of sheets, or the like. In order to recognize the individual paper feed cassette units that are connected, the main body part detects the nth connection stage of each particular paper feed cassette unit with control signals. If the number of such control signals is increased, there arises a need for giving a space to wire the control lines in the circuit board in the main body part, for example, and thus a mechanism for reducing the number of control lines has been developed.

For example, there has been proposed a technique in which one reset signal and one clock signal are outputted from the main body part to be inputted to the paper feed cassette unit at each stage, while one connection signal is inputted from the paper feed cassette unit at each stage to the main body part, and three control lines in total are used for connection detection (for example, refer to Patent Document 1). With the technique in Patent Document 1, the paper feed cassette unit at each stage is provided with a flip-flop, and the reset signal and the clock signal that are outputted from the main body part are branched and inputted to the flip-flop at each stage, respectively. Thereby, the state of the connection signal that is outputted from the flip-flop at each stage is changed in turn to perform connection detection.

SUMMARY

The present disclosure provides an image forming apparatus including a main body part, and a paper feed cassette unit that is capable of being piled up in a plurality of stages under a bottom part of the main body part. The main body part has a start control line that transmits a start signal, a ready control line that transmits a ready signal, and a main body side control part. The main body side control part generates the start signal, and detects the nth connection stage of the paper feed cassette unit on the basis of the number of times of the ready signal. The paper feed cassette unit has a cassette side control part. The cassette side control part delays the start signal inputted from an upper stage through the start control line and outputs it to a lower stage, and that, while delaying the start signal, generates the ready signal to output it toward the ready control line to the upper stage.

Further, the present disclosure provides a method for detecting the nth connection stage of a paper feed cassette unit that is piled up in a plurality of stages under a bottom part of a main body part. When a start signal is inputted from the main body part to the paper feed cassette unit at an uppermost stage, the paper feed cassette unit at the uppermost stage delays the inputted start signal to output it toward a paper feed cassette unit at a lower stage. The paper feed cassette unit at the uppermost stage generates, while delaying the start signal, a ready signal to output it to the main body part. The paper feed cassette unit at the lower stage delays the inputted start signal to output it to the paper feed cassette unit at a still lower stage. The paper feed cassette unit at the lower stage generates, while delaying the start signal, a ready signal to output it to the main body part.

DETAILED DESCRIPTION

Next, an embodiment of the present disclosure will be specifically explained with reference to the drawings.

Figure 1:
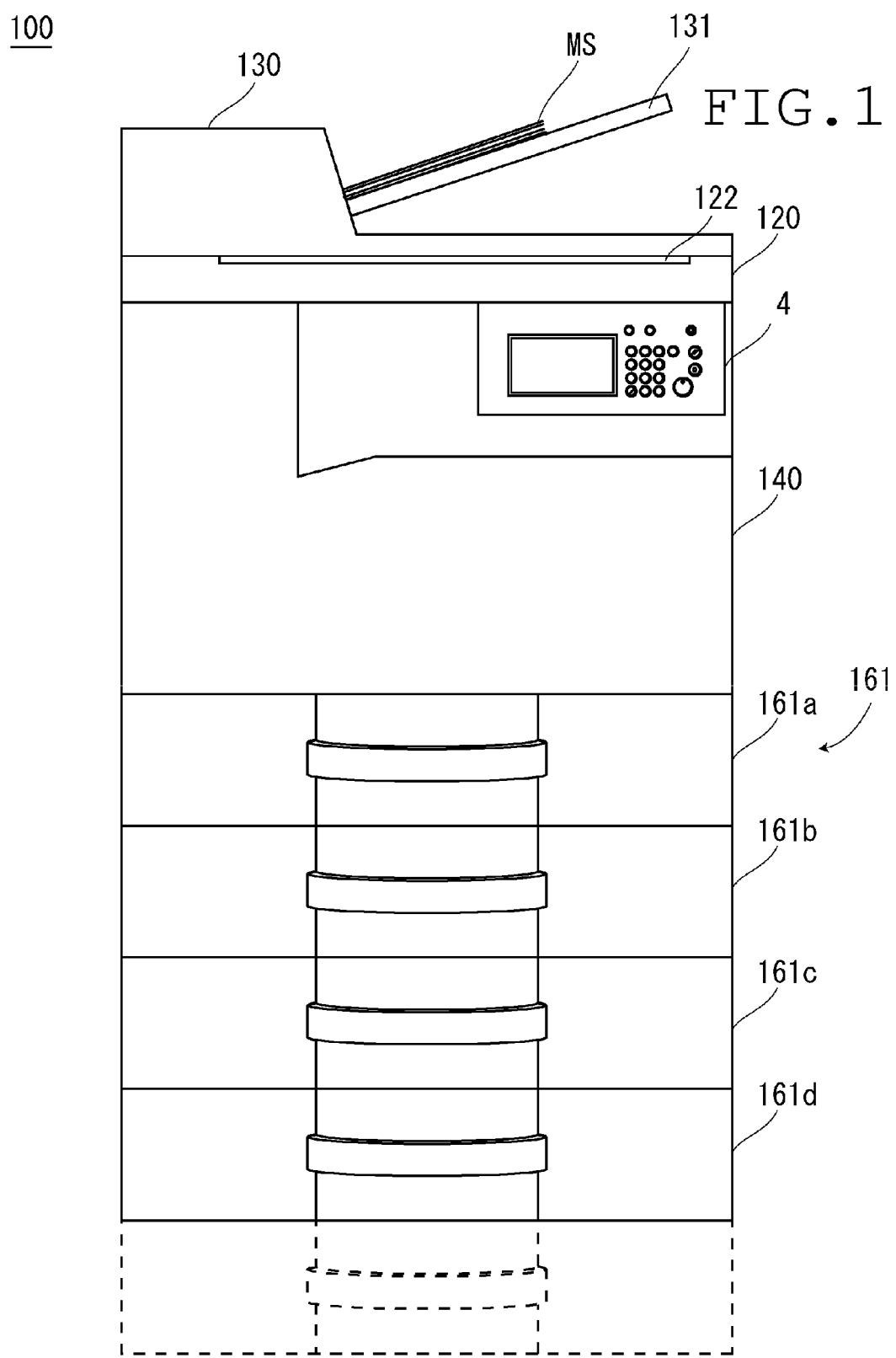
FIG. 1 is an appearance drawing of an image forming apparatus of an embodiment according to the present disclosure.

An image forming apparatus 100 of the embodiment of the present disclosure is a copying machine having a copying function, a printing function, a scanner function, and the like, and referring to FIG. 1, it includes a document reading part 120, a document feeding part 130, and a main body part 140. The document reading part 120 is disposed on top of the main body part 140, and the document feeding part 130 is disposed on top of the document reading part 120.

On the front side of the image forming apparatus 100, there is disposed an operation panel 4 for performing setting or an operation instruction for the image forming apparatus 100. The operation panel 4 includes a touch panel and operation buttons. The touch panel functions as a display means and an input means, being provided with a transparent pressure-sensitive sensor on a surface of a display part that displays various operation keys and an image formation situation. The touch panel detects a touch operation onto the display surface to output a signal corresponding to the location where the touch operation is detected, thereby receiving the operation on an operation key displayed on the display part. The operation buttons include various operation keys, such as ten keys for inputting a numerical value, such as the number of printing sheets, a reset key to input an instruction for initializing the set information, a stop key to stop copying operation, and a start key to input an output instruction for starting a printing operation.

The document reading part 120 is a scanner that irradiates light onto a document MS carried by the document feeding part 130, or a document placed on a platen glass 122 by a user, and receives the reflected light, and the like, to read the document image, thereby outputting the image data.

The document feeding part 130 is configured to be tiltable, and by bringing the document feeding part 130 upward, the top face of the platen glass 122 can be opened to allow the document MS to be placed on the platen glass 122. The document feeding part 130 feeds the documents MS placed on the document mounting part 131 sheet by sheet in turn to carry them to the document reading part 120.

The main body part 140 forms a latent image on the surface of a photosensitive drum 151 on the basis of the image data read by the document reading part 120 or the image data read out from a storage part (not shown). Then, the main body part 140 performs image formation in which toner is used to make the latent image into a toner image; transfers the toner image on the photosensitive drum onto a recording paper carried from a paper feeding part 160; fixes the toner image on the recording paper; and then discharges the recording paper.

The paper feeding part 160 has a paper feed cassette unit 161, which is connected to a bottom part of the main body part 140, and feeds the recording papers stored in the paper feed cassette unit 161 sheet by sheet in turn to carry them to the main body part 140. The paper feed cassette unit 161 can be piled up in a plurality of stages to be connected to the main body part 140, being linked to one another. FIG. 1 gives an example in which four stages of the paper feed cassette unit 161, i.e., paper feed cassette units 161a to 161d are connected to the main body part 140, being piled up.

Figure 2:
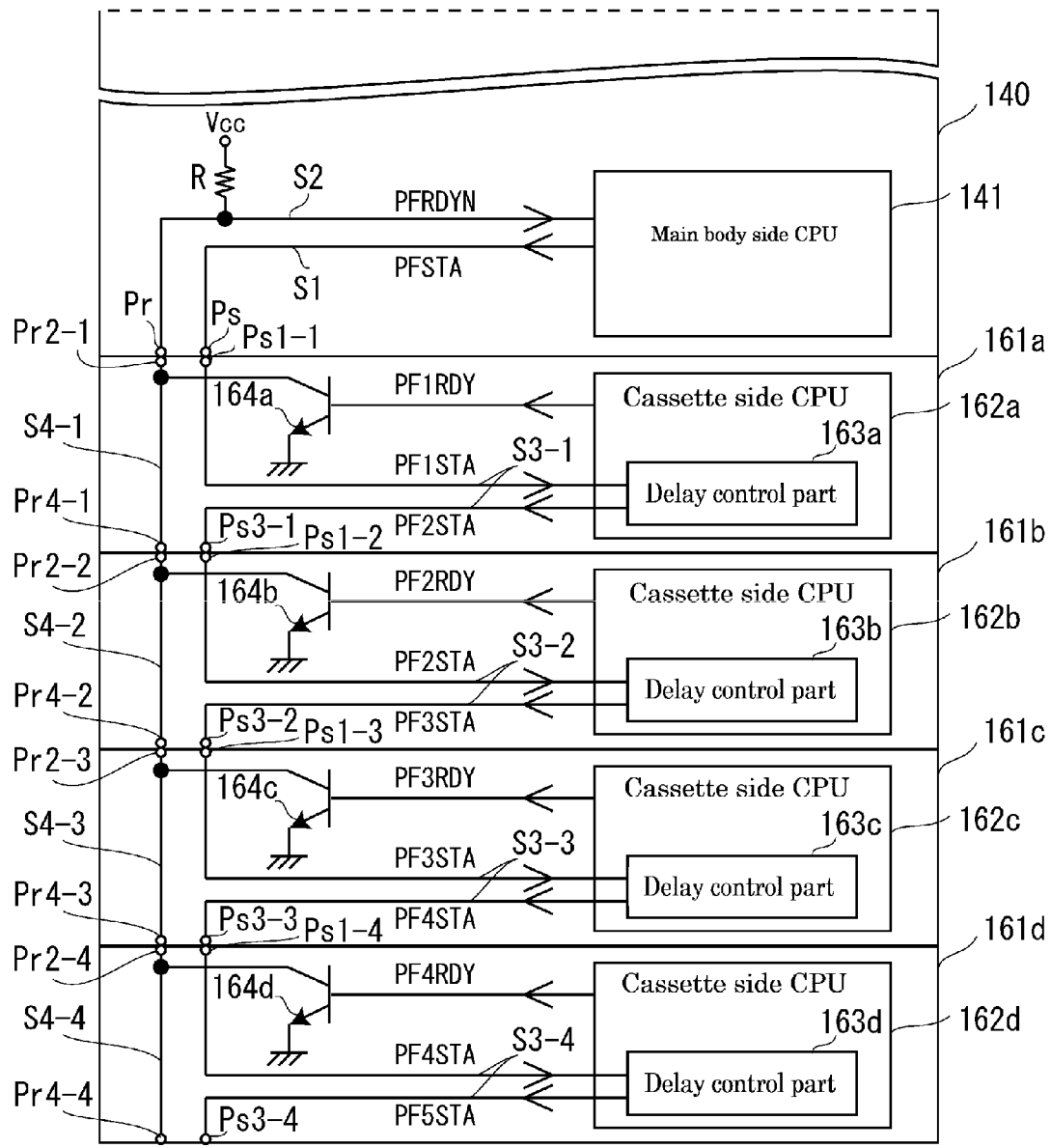
FIG. 2 is a circuit diagram illustrating a circuitry with which a main body side CPU detects the nth connection stage of a paper feed cassette unit that is piled up.

FIG. 2 is a circuit diagram illustrating a connection configuration of the main body part 140 and the paper feed cassette units 161a to 161d.

The main body part 140 has a main body side CPU (a main body side control part) 141. To the main body side CPU 141, there are electrically connected a start control line S1 that is used to output a start signal (a PFSTA signal), and a ready control line S2 that is used to input a ready signal (a PFRDYN). The ready control line S2 is electrically connected to a terminal Vcc through a pull-up resistor R, the ready signal (the PFRDYN) being at a High level to be in the disabled state.

In the bottom part of the main body part 140, there are provided connection terminals Ps and Pr for connecting the paper feed cassette unit 161. To the connection terminal Ps, the start control line S1 is electrically connected, while, to the connection terminal Pr, the ready control line S2 is electrically connected.

The paper feed cassette units 161a to 161d have the same configuration, and the paper feed cassette unit 161a will be used as an example for explanation.

On top of the paper feed cassette unit 161a, there are provided a first connection terminal Ps1-1 and a second connection terminal Pr2-1, while, on bottom of the paper feed cassette unit 161a, there are provided a third connection terminal Ps3-1 and a fourth connection terminal Pr4-1. When the paper feed cassette unit 161a is connected at a lower stage of the main body part 140 as the first stage, the first connection terminal Ps1-1 and the connection terminal Ps are electrically connected to each other, and the second connection terminal Pr2-1 and the connection terminal Pr are electrically connected to each other.

In the case where another paper feed cassette unit 161 is connected at a lower stage of the paper feed cassette unit 161a, the third connection terminal Ps3-1 is electrically connected to a first connection terminal Ps1 (Ps1-2, Ps1-3, . . . ) in the another paper feed cassette unit 161 (161b to 161d). In addition, the fourth connection terminal Pr4-1 is electrically connected to a second connection terminal Pr2 (Pr2-2, Pr2-3, . . . ) in the another paper feed cassette unit 161.

Further, the paper feed cassette unit 161a may be connected at a lower stage of another paper feed cassette unit 161 rather than to the main body part 140. In this case, the first connection terminal Ps1-1 of the paper feed cassette unit 161a is electrically connected to a third connection terminal Ps3 (Ps3-2, Ps3-3, . . . ) in the another paper feed cassette unit 161. In addition, the second connection terminal Pr2-1 of the paper feed cassette unit 161a is electrically connected to a fourth connection terminal Pr4 (Pr4-2, Pr4-3, . . . ) in the another paper feed cassette unit 161.

The start signal (PFSTA) in the enabled state that has been generated in the main body side CPU 141 is a start signal (PF1STA) for starting communication with the paper feed cassette unit 161a at the first stage. The start signal (PF1STA) is inputted to a delay control part 163a in a cassette side CPU (a cassette side control part) 162a in the paper feed cassette unit 161a through the start control line S1, the connection terminal Ps, the first connection terminal Ps1-1, and a start control line S3-1. The cassette side CPU 162a is provided in the middle of the start control line S3-1, causing a delay control part 163a to delay the start signal inputted from the upper stage for outputting it to the lower stage.

In addition, when the start signal (PF1STA) is inputted to the delay control part 163a, the cassette side CPU 162a generates and outputs the ready signal (PF1RDY) in the enabled state as a response signal to the start signal (PF1STA). The ready signal (PF1RDY) in the enabled state is inputted to a base terminal of a transistor 164a for the cassette side CPU 162a, turning the transistor 164a ON.

The transistor 164a is of open collector type. With the transistor 164a, the base terminal is connected to the cassette side CPU 162a; a collector terminal thereof is connected to a ready control line S4-1 between the second connection terminal Pr2-1 and the fourth connection terminal Ps4-1 in the paper feed cassette unit 161a; and an emitter terminal thereof is grounded. With the transistor 164a being turned ON, the ready signal (PFRDYN) on the ready control line S2 is dropped to a Low level through the ready control line S4-1, the second connection terminal Pr2-1, and the connection terminal Pr. Thereby, to the main body side CPU 141, the ready signal in the enabled state by the cassette side CPU 162a is inputted.

Once the cassette side CPU 162a outputs the ready signal (PF1RDY) in the enabled state, it starts timing with a timer (not shown), and when a specific time has elapsed, it changes the ready signal (PF1RDY) from the enabled state to the disabled one. This turns the transistor 164a OFF, thereby the ready signal (PFRDYN) inputted to the main body side CPU 141 being changed from the enabled state (the Low level) to the disabled state (the High level).

On the basis of the ready signal (PFRDYN) having been changed from the disabled state to the enabled state for the first time after the output of the start signal (PFSTA), the main body side CPU 141 detects that the paper feed cassette unit 161a is connected at the first stage.

In the delay control part 163a, in order to provide a time for causing the main body side CPU 141 to detect the nth connection stage of the paper feed cassette unit 161a, a process for delaying the start signal (PF1STA) by a specific delay time is performed. The start signal (PF2STA) that has been delayed is outputted toward the paper feed cassette unit 161 (161b to 161d) at the subsequent stage through the start control line S3-1 and the third connection terminal Ps3-1. Further, the time for which the delay control part 163a delays the start signal (PF1STA) is set longer than the time from the moment when the cassette side CPU 162a enables the ready signal (PF1RDY) to the moment when it disables the ready signal (PF1RDY).

Likewise, the first connection terminal Ps1 and the second connection terminal Pr2 of the respective paper feed cassette units 161b to 161d at the second to fourth stages are connected to the third connection terminal Ps3 and the fourth connection terminal Pr4 of the paper feed cassette unit 161a to 161c at the previous stage, respectively. In addition, the third connection terminal Ps3 and the fourth connection terminal Pr4 of the respective paper feed cassette units 161b and 161c at the second and third stages are connected to the first connection terminal Ps1 and the second connection terminal Pr2 of the paper feed cassette unit 161c and 161d at the subsequent stage.

In this way, in the present embodiment, the start signal is outputted in a relayed fashion, starting from the main body side CPU 141, to the paper feed cassette 161 at the subsequent stage. Then, the ready signal generated (enabled) in the paper feed cassette 161 to which the start signal has been inputted is outputted toward the ready control line S2, thereby the nth connection stage of the paper feed cassette 161 that is piled up being detected by the main body side CPU 141.

Figure 3:
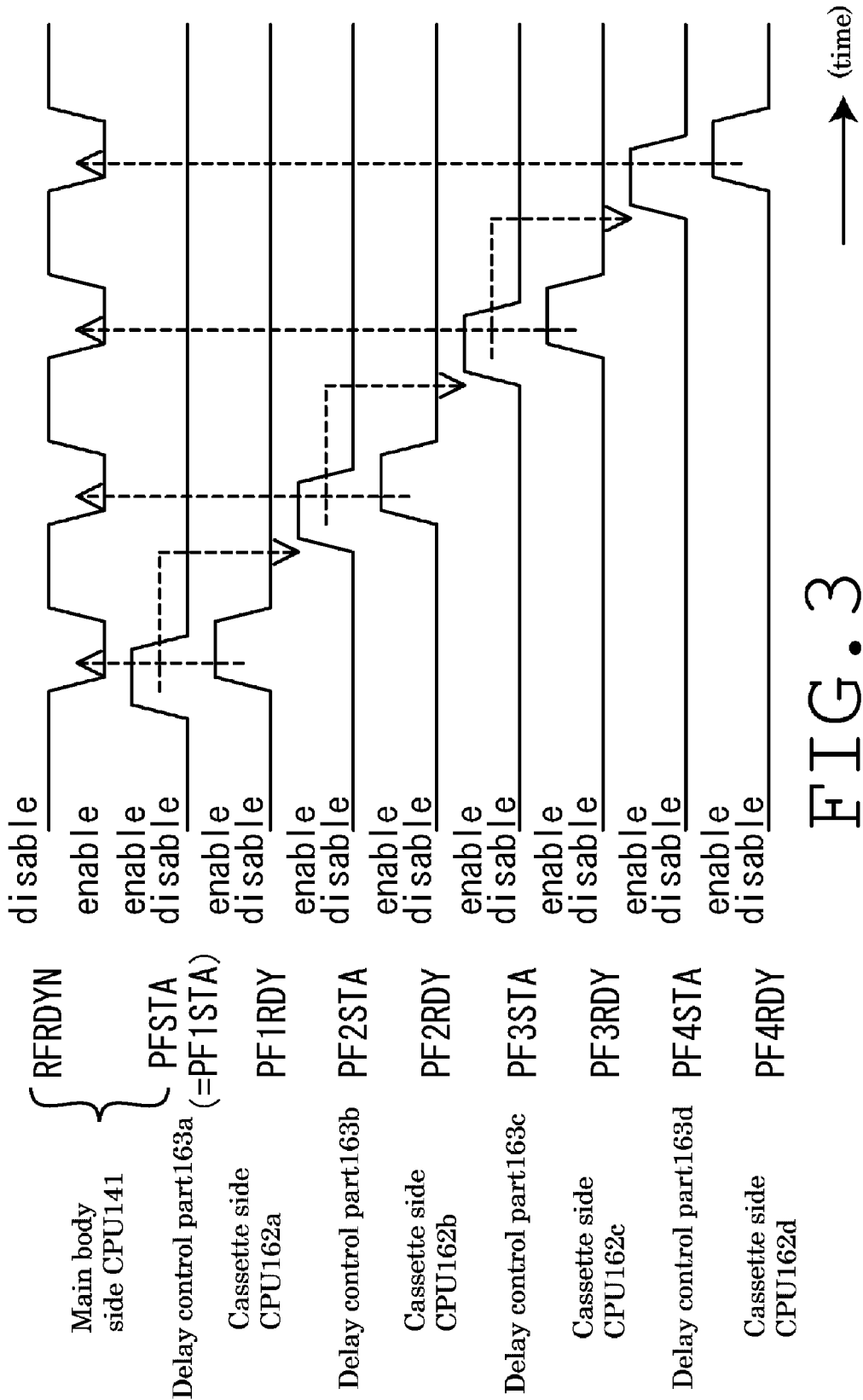
FIG. 3 is a timing chart illustrating the output timing for a start signal and a ready signal in the main body side CPU and the respective paper feed cassette units that are shown in FIG. 2.

Specifically, with reference to FIG. 3, the output timing for the start signal (PFSTA) outputted from the main body side CPU 141 and the ready signal (PFRDYN) inputted to the main body side CPU 141, and that for the start signals (PF1STA, PF2STA, PF3STA, and PF4STA) and the ready signals (PF1RDA, PF2RDA, PF3RDA, and PF4RDA) in the paper feed cassette units 161a to 161d at the first to fourth stages will be explained.

First, the main body side CPU 141 changes the start signal (PFSTA) from the disabled state to the enabled state for outputting it. The start signal (PFSTA) from the main body side CPU 141 is inputted to the delay control part 163a of the cassette side CPU 162a at the first stage as the start signal (PF1STA). Herein, it is assumed that the time to the moment when the start signal (PFSTA) is inputted to the delay control part 163a as the start signal (PF1STA) is so short as to be negligible.

When the start signal (PF1STA) is inputted to the delay control part 163a, the cassette side CPU 162a outputs the ready signal (RF1RDY) in the enabled state. The ready signal (RF1RDY) generated by the cassette side CPU 162a turns the transistor 164a ON, thereby the ready signal (PFRDYN) in the enabled state being inputted to the main body side CPU 141.

On the basis of the number of times by which the start signal (PFRDYN) in the enabled state has been inputted from the moment when the start signal (PFSTA) has been outputted, the main body side CPU 141 detects the nth connection stage of the paper feed cassette 161 that is piled up under the bottom part of the main body part 140. With the ready signal (RF1RDY) in the enabled state having been outputted by the cassette side CPU 162a, the ready signal (PFRDYN) in the enabled state is inputted to the main body side CPU 141 for the first time after the output of the start signal (PFSTA). Thereby, the main body side CPU 141 detects that the paper feed cassette 161a is connected at the first stage.

At this time, the start signal (RF1STA) that has been inputted by the delay control part 163a is delayed by the delay control part 163a by a specific delay time (for example, 20 to 30 msec). Therefore, when the main body side CPU 162a is detecting the paper feed cassette unit 161 at the first stage, the start signal (PFSTA=PF1STA) from the main body side CPU 141 is reserved in the delay control part 163a, and will not be inputted to the cassette side CPUs 162b to 162d in the paper feed cassettes 161b to 161d at the second and subsequent stages. Therefore, the ready signals (PF2RDY, PF3RDY, and PF4RDY) from the cassette side CPUs 162b to 162d at the second and subsequent stages are in the disabled state. When a specific delay time has elapsed, the start signal (PF2STA) that has been delayed is outputted from the delay control part 163a to the paper feed cassette unit 161b at the lower stage.

When a specific time has elapsed after the output of the ready signal (RF1RDY) in the enabled state, the cassette side CPU 162a disables the ready signal (RF1RDY). Thereby, the transistor 164a is turned OFF, and the ready signal (PFRDYN) inputted to the main body side CPU 141 is disabled.

When the start signal (PF1STA) that has been inputted is delayed by the delay control part 163a by a specific delay time, the delay control part 163a outputs it toward the paper feed cassette unit 161b at the lower stage. The start signal (PF3STA) that has been delayed by the delay control part 163a is inputted to the delay control part 163b in the paper feed cassette unit 161b at the lower stage.

With the start signal (PF3STA) being inputted to the delay control part 163b from the upper stage, the cassette side CPU 162b in the paper feed cassette unit 161b outputs the ready signal (RF2RDY) in the enabled state. With the ready signal (RF2RDY) in the enabled state being outputted from the cassette side CPU 162b, the transistor 164b is turned ON, thereby, the ready signal (PFRDYN) in the enabled state being again inputted to the main body side CPU 141.

On the basis of the ready signal (PFRDYN) in the enabled state having been inputted for the second time after the output of the start signal (PFSTA), the main body side CPU 141 detects that the paper feed cassette 161b is connected at the second stage.

When a specific time has elapsed after the output of the ready signal (RF2RDY) in the enabled state, the cassette side CPU 162b disables the ready signal (RF2RDY). Thereby, the transistor 164b is turned OFF, and the ready signal (PFRDYN) inputted to the main body side CPU 141 is again disabled.

The delay control part 163b delays the start signal (PF2STA) that has been inputted, and outputs it. The start signal (PF3STA) that has been delayed by the delay control part 163a is inputted to the delay control part 163c in the paper feed cassette unit 161c at the lower stage.

Likewise, with the delay control part 163c and cassette side CPU 162c in the paper feed cassette unit 161c at the third stage, and the delay control part 163d and cassette side CPU 162d in the paper feed cassette unit 161d at the fourth stage, output control of the ready signals (RF3RDY and RF4RDY) and the start signal (PF4STA) are performed. Thereby, on the basis of the number of times by which the ready signal (PFRDYN) in the enabled having been inputted, the main body side CPU 141 detects that the paper feed cassette unit 161c is connected at the third stage, and the paper feed cassette unit 161d is connected at the fourth stage.

Further, in the case of the present embodiment, to the paper feed cassette unit 161d at the fourth stage, the paper feed cassette unit 161 at the fifth stage is not connected. Therefore, the start signal (PF5STA) that has been delayed can be opened at the third connection terminal Ps3-4 of the paper feed cassette unit 161d at the fourth stage, or grounded with a high resistance for increasing the noise resistance.

When a specific time has been elapsed after the output of the start signal (PFSTA), the time for the main body side CPU 141 expires, thereby the connection detection processing by the main body side CPU 141 on the paper feed cassette units 161a to 161d being terminated. For example, the time which expires may be determined on the basis of such a factor as the maximum number of connected units of the paper feed cassette unit 161 with respect to the main body part 140.

The pulse time width of the start signal outputted to a lower stage is required only to be a time that is sufficient for the cassette side CPU 162a to 162d at the lower stage to make noise canceling processing (for example, 2 msec).

Further, the time period during which the cassette side CPU 162a to 162d is outputting the ready signal (PF1RDY, PF2RDY, PF3RDY, or PF4RDY) in the enabled state may be, for example, 1 to 3 msec. While the ready signal (PFRDYN) in the enabled state is being inputted through the ready control line S2, the main body side CPU 141 can serially make a data communication, such as allocating an identification ID to the cassette side CPU 162a to 162d that has been detected for connection, through a data line (not shown). In other words, the ready signal has not only the function to indicate the connection to the main body part 140 in response to the start signal, but also the function to indicate whether or not it is possible to make communication with the main body part 140. Therefore, the time during which the cassette side CPU 162a to 162d is outputting the ready signal (PF1RDY, PF2RDY, PF3RDY, or PF4RDY) in the enabled state is preferably set according to the time for communication with the main body side CPU 141.

The time for which the delay control part 163a to 163d delays the start signal (PF1STA, PF2STA, PF3STA, or PF4STA) may be, for example, 20 to 30 msec.

Thus, the main body side CPU 141 is connected to the start control line S1, which transmits a start signal (PFSTA), and the ready control line S2, which transmits a ready signal (PFRDYN), generating the start signal (PFSTA), and on the basis of the number of times of the ready signal (PFRDYN), detecting the nth connection stage of the paper feed cassette unit 161a to 161d. In addition, the paper feed cassette units 161a to 161d can be piled up in a plurality of stages under the bottom part of the main body part 140, including the cassette side CPUs 162a to 162d. The cassette side CPU 162a to 162d delays the start signal (PF1STA, PF2STA, PF3STA, or PF4STA), which is inputted from the upper stage through the start control line S1, and outputs it to the lower stage. In addition, while the cassette side CPU 162a to 162d is delaying the start signal (PF1STA, PF2STA, PF3STA, or PF4STA), which has been inputted, the cassette side CPU 162a to 162d generates the ready signal (PF1RDY, PF2RDY, PF3RDY, or PF4RDY) in the enabled state to output it toward the ready control line S2 to the upper stage.

Therefore, according to the present embodiment, the main body side CPU 141 can detect the nth connection stage of the paper feed cassette unit 161a to 161d by means of two control signals of the start signal (PFSTA) and the ready signal (PFRDYN). Therefore, only two control lines, i.e., the start control line S1 and the ready control line S2, are required to be connected to the main body side CPU 141. In addition, in the present embodiment, no flip-flops are utilized, and thus there are no signal lines causing an edge trigger, whereby the noise resistance can be enhanced. In addition, in the present embodiment, no hardware means of a flip-flop is used, whereby the product cost can be suppressed.

The present disclosure is not limited to the above-described embodiment, and of course can be altered in various ways within the scope of the gist of the present disclosure.

What is claimed is:

1. An image forming apparatus comprising a main body part, and a paper feed cassette unit that is capable of being piled up in a plurality of stages under a bottom part of the main body part,
    the main body part including:
    a start control line that transmits a start signal,
    a ready control line that transmits a ready signal, and
    a main body side control part that generates the start signal, and detects the number of connection stage of the paper feed cassette unit connected with respect to the main body on the basis of the number of times of the ready signal,
    the paper feed cassette unit including:
    a cassette side control part that delays the start signal inputted from an upper stage through the start control line and outputs it to a lower stage, and that, while delaying the start signal, generates the ready signal to output it toward the ready control line to an upper stage.

2. The image forming apparatus according to claim 1, wherein the main body side control part
    performs, during input of the ready signal, communication with the cassette side control part that is outputting the ready signal.

3. The image forming apparatus according to claim 1, wherein the cassette side control part
    uses the generated ready signal to notify the main body part of the cassette side control part being connected to the main body part and of the cassette side control part being capable of communicating with the main body part.

4. A method for detecting the number of connection stage of a paper feed cassette unit that is piled up in a plurality of stages under a bottom part of a main body part,
    the main body part inputting a start signal to the paper feed cassette unit at an uppermost stage,
    the paper feed cassette unit at the uppermost stage delaying the inputted start signal to output it toward a paper feed cassette unit at a lower stage,
    the paper feed cassette unit at the uppermost stage generating, while delaying the start signal, a ready signal to output it to the main body part,
    the paper feed cassette unit at the lower stage delaying the inputted start signal to output it to the paper feed cassette unit at a still lower stage, and
    the paper feed cassette unit at the lower stage generating, while delaying the start signal, a ready signal to output it to the main body part.

5. The method for detecting the
    connection stage of a paper feed cassette unit according to claim 4, wherein the main body part performs, during input of the ready signal, communication with the paper feed cassette unit that is outputting the ready signal.

6. The method for detecting the number of connection stage of a paper feed cassette unit according to claim 4, wherein the paper feed cassette unit uses the generated ready signal to notify the main body part that it is connected to the main body part, and that it is capable of communicating with the main body part.

* * * * *